United States Patent
Weissbach et al.

(10) Patent No.: US 8,294,398 B2
(45) Date of Patent: Oct. 23, 2012

(54) ONE-PHASE BRUSHLESS MOTOR

(75) Inventors: Henry Weissbach, Uhlingen-Birkendorf (DE); Jens Löffler, Villingen-Schwenningen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 277 days.

(21) Appl. No.: 12/830,492

(22) Filed: Jul. 6, 2010

(65) Prior Publication Data

US 2011/0006712 A1    Jan. 13, 2011

(30) Foreign Application Priority Data

Jul. 11, 2009   (DE) .................. 10 2009 033 526

(51) Int. Cl.
*H02P 6/04* (2006.01)

(52) U.S. Cl. .......... 318/400.11; 318/400.22; 318/400.35

(58) Field of Classification Search ............. 318/400.11, 318/400.22, 400.35, 439, 560, 600, 630
See application file for complete search history.

(56) References Cited

U.S. PATENT DOCUMENTS

| | | | | |
|---|---|---|---|---|
| 4,719,361 A * | 1/1988 | Brubaker | .................. | 290/45 |
| 5,757,100 A | 5/1998 | Burgbacher | .................. | 310/186 |
| 6,452,349 B1 * | 9/2002 | Hahn et al. | .............. | 318/400.22 |
| 7,091,643 B2 | 8/2006 | Burgbacher | .................. | 310/156 |
| 7,141,949 B2 * | 11/2006 | Harwood | .................. | 318/400.35 |
| 7,397,215 B2 | 7/2008 | Lelkes | .................. | 318/599 |
| 7,420,307 B2 | 9/2008 | Lelkes et al. | .................. | 310/180 |
| 7,716,018 B2 | 5/2010 | Pecher | .................. | 702/190 |
| 2005/0077854 A1 | 4/2005 | Lelkes et al. | .................. | 318/439 |
| 2005/0253546 A1 | 11/2005 | Dornhof | .................. | 318/439 |
| 2006/0197482 A1 * | 9/2006 | Harwood | .................. | 318/439 |
| 2007/0282461 A1 * | 12/2007 | Harwood | .................. | 700/14 |
| 2011/0006712 A1 * | 1/2011 | Weissbach et al. | ...... | 318/400.11 |

FOREIGN PATENT DOCUMENTS

| | | |
|---|---|---|
| DE | 102004-027800 | 1/2006 |
| DE | 102005-035451 | 2/2006 |
| EP | 1596495 | 11/2005 |

OTHER PUBLICATIONS

Microchip Techn. Inc., "PIC12F629/675 DataSheet: 8-PIN, Flash-Based 8-Bit CMOS Microcontrollers", excerpt pp. 1-6, retrieved Jul. 1, 2010 from the U.R.L. WWW.MICROCHIP.COM.

* cited by examiner

*Primary Examiner* — Paul Ip
(74) *Attorney, Agent, or Firm* — Milton Oliver, Esq.; Oliver Intellectual Property LLC

(57) ABSTRACT

An electronically commutated one-phase motor (20; 20') has a stator having at least one winding strand (30, 32; 30'), and it has a permanent-magnet rotor (22) that induces, as it rotates, a voltage ($u_{ind}$) in the winding strand. The motor further has an electronic calculation device or microcontroller (26) which is configured to execute, during operation, the following steps repetitively: sampling the induced voltage ($u_{ind}$) in a currentless winding strand, for example, during a half-wave of the induced voltage, in order to obtain a plurality of analog voltage values; digitizing the analog voltage values in order to obtain a plurality of digitized voltage values; and processing the plurality of digitized voltage values to ascertain the instantaneous rotation direction of the motor rotor.

The control circuit then can use these data to assure reliable motor start-up, regardless of any external driving forces which occur.

4 Claims, 9 Drawing Sheets

ONE-PHASE BRUSHLESS MOTOR

CROSS-REFERENCE

This application claims priority from our German Application DE 10 2009 033 526.9, filed 11 Jul. 2009, the entire content of which is hereby incorporated by reference.

FIELD OF THE INVENTION

The present invention relates generally to one-phase electronically commutated motors (ECMs) and, more particularly, to an improved motor configuration which facilitates reliable motor start-up.

BACKGROUND

One-phase electronically commutated motors (ECMs) are inexpensive and are therefore often used for specific driving tasks, e.g. for fans or centrifugal pumps. They are usually controlled by means of a Hall (magnetic position detecting) sensor. Commutation without a sensor, referred to using the term "sensorless," is, however, desirable.

The terminology of such motors is somewhat confusing. For accurate definition of an ECM, firstly the number of stator current pulses per rotor rotation of 360° el. is indicated, e.g. single-pulse, two-pulse, three-pulse, etc.; also the number of winding strands in the stator is indicated, e.g. single-strand, two-strand, three-strand, etc.

An ECM can therefore e.g. be described as single-strand and two-pulse, or two-strand and two-pulse. Because there is no difference between these two types of motor in terms of physical operation, and because simplified terminology is always desirable for practical use, such motors are generally referred to, in the trade, as "one-phase" ECMs, even though they can have either only a single strand or two strands.

Because the rotor in such motors has rotational positions at which the motor cannot generate any electromagnetic torque, an auxiliary torque is used, that is effective at those zero positions. This can be a magnetically generated auxiliary torque, which is referred to as "reluctance" torque. Alternatively, this auxiliary torque could be generated mechanically, for example by means of a spring that is tensioned in certain rotational positions and delivers its stored energy at said zero positions. The function of this auxiliary torque is chiefly to rotate the rotor so that at startup, it is not in a rotational position in which the motor cannot generate an electromagnetic torque since, otherwise, the motor would not be able to start.

Such motors have a preferred rotation direction in which they start easily, and a rotation direction opposite to the preferred rotation direction, in which startup is more difficult but not impossible.

In the case of fans or pumps, an additional difficulty arises from the fact that they can be driven by the medium being transported, for example by a high wind or a storm; in such a case it is not known whether the rotor is being rotated in, or (alternatively) against, the preferred direction by that external driving force.

In a storm, the rotation speed of the rotor can become fairly high; and in such a case, with a motor that has no Hall sensor, firstly the rotation direction must be identified and, if it is the wrong one, the motor must be reversed and (as an example) switched over from a rotation speed of −3800 rpm to a speed of +4100 rpm. A prerequisite for this is an identification of the rotation direction.

It is known from DORNHOF EP 1 596 495 A2 and corresponding US 2005-253546-A1 that in the context of a "one-phase" ECM of this kind with auxiliary reluctance torque, the rotation direction can be identified from the shape of the induced voltage, i.e. from the voltage induced in a currentless winding strand by the permanent-magnet rotor as it rotates.

It is therefore an object of the invention to make available a novel one-phase ECM, i.e. an ECM that can be either single-strand or two-strand. This object is achieved by sampling induced voltage in a currentless winding, digitizing them, and using the sampled values to ascertain the instantaneous direction of rotation. The invention makes it possible to identify the rotation direction in an ECM of the kind cited initially, thereby making it possible to use such an ECM even in a location where it can be caused to rotate by an external driving force since, once the rotation direction is identified, certain countermeasures can be taken if a determination has previously been made that the motor is (usually as a result of external driving force) rotating in a wrong rotation direction.

BRIEF FIGURE DESCRIPTION

Further details and advantageous refinements of the invention are evident from the exemplifying embodiments, in no way to be understood as a limitation of the invention, that are described below and shown in the drawings.

DETAILED DESCRIPTION

Figure 1:
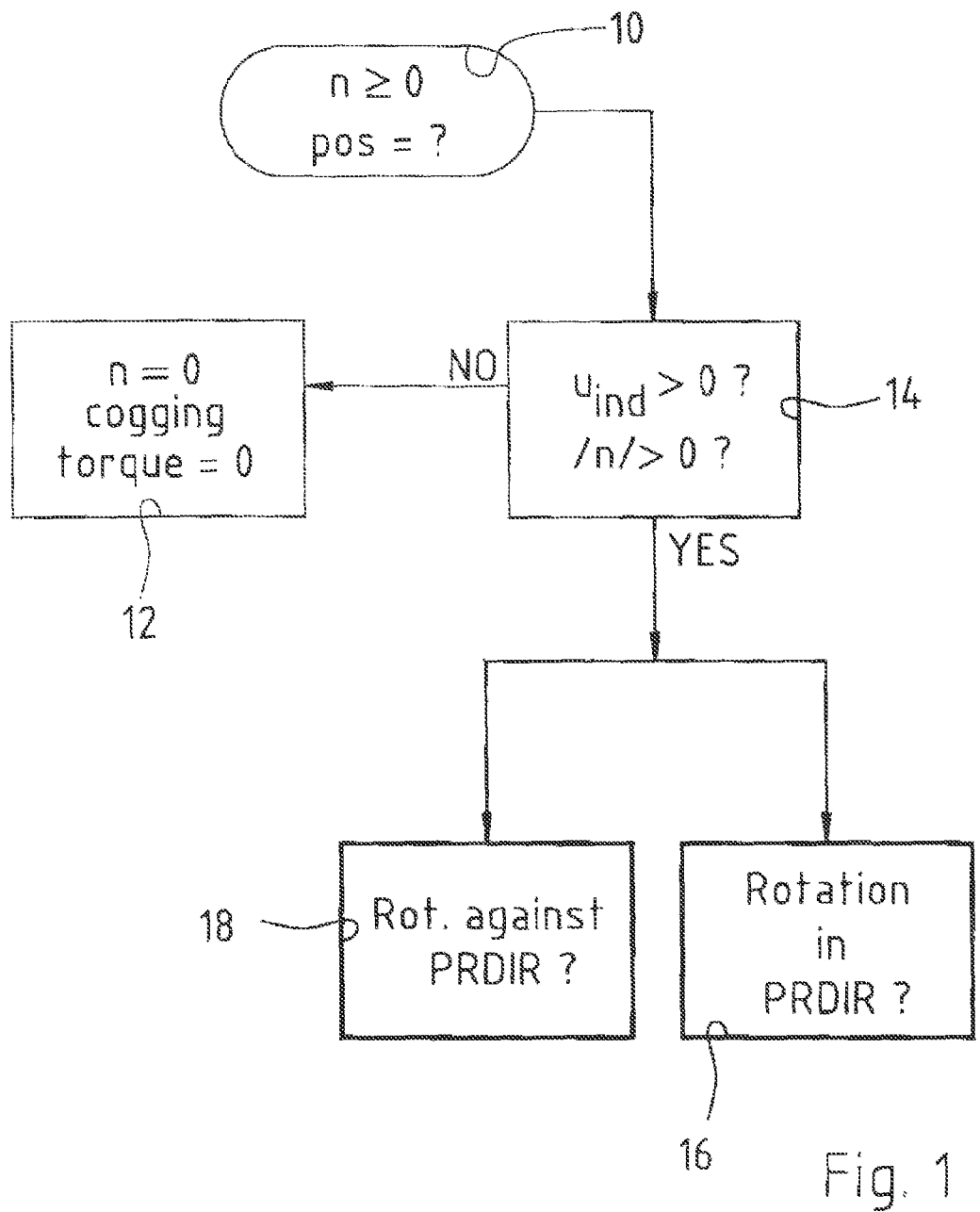
FIG. 1 is an overview diagram that schematically shows various situations that can occur during operation of a sensorless one-phase motor and must therefore be taken into account in its software, in order to ensure reliable starting of the motor.

FIG. 1 schematically shows problems that must be taken into account when developing a "sensorless one-phase ECM."

After being switched on, the motor is in situation 10 of FIG. 1, i.e. it has either a rotation speed n=0 or (if externally driven) a rotation speed n≈0, and its rotational position "pos" is unknown (to the motor's electronics), since a rotational position sensor is not present.

Step 14 measures whether an induced voltage $u_{ind}$ is present, i.e. whether $u_{ind}$ is greater than zero. This can also be the case, for example, when a fan is being driven by wind. In addition, a measurement is made as to whether the magnitude of n is greater than zero.

If the response to both queries is NO, the program goes to step 12, which indicates that the rotation speed has a value of zero, and also that the so-called "cogging torque" has a value of zero, i.e. the rotor has "snapped" into one of its detent or cogging positions.

If the responses in step 14 are YES, the rotor is either rotating in its preferred direction PRDIR (step 16) or rotating oppositely to its preferred direction PRDIR (step 18). The rotation direction cannot, however, be deduced from the existing data.

In this case, the motor can rotate in either of the two rotation directions; the normal motor current is flowing, but the motor might rotate in the wrong direction. The "wrong" rotation direction means that it must be reversed after starting.

If external driving, e.g. as a result of wind, is occurring, the first task, after switching on, is therefore to identify the rotation direction of the rotating rotor.

Figure 2:
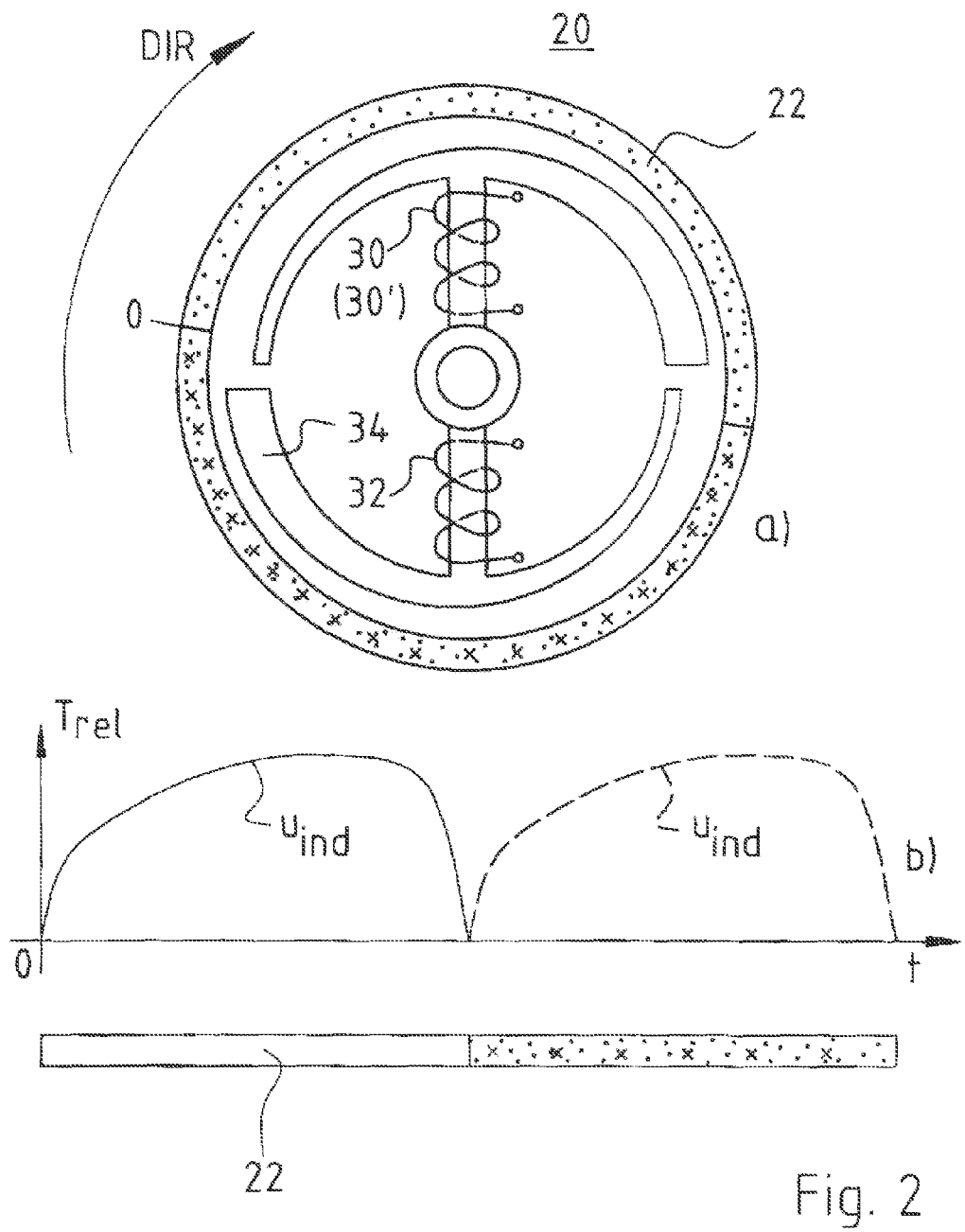
FIG. 2 is a schematic depiction to explain an Electronically Commutated Motor (ECM) that operates with a reluctance torque.

FIGS. 2a) and 2b) show, highly schematically and only as an example, the structure of a motor 20 that uses an auxiliary reluctance torque. It has a permanent-magnet rotor 22, in this case an external rotor having two poles, and it has a stator having a stator winding 30 and a stator winding 32. The stator lamination stack is labeled 35, and, in this example, has a shape characteristic of such motors, approximately comparable to two sawteeth.

The pole gaps of rotor 22, one of them labeled 0 and the other located directly opposite, position themselves approximately in the rotational position depicted when the stator is currentless, provided no external driving force is present; in other words, the pole gaps seek out the location with the largest air gap. When rotor 22 is being driven from the outside, it generates in stator windings 30, 32 an induced voltage $u_{ind}$ that is measured and analyzed when current flow is occurring (in rotation direction DIR).

The present invention relates to instances 16 and 18, i.e. firstly, when external driving is occurring, the rotation direction of the motor being driven by the wind (or other forces) must be identified, so that the motor can then be operated in the correct rotation direction.

Figure 3:
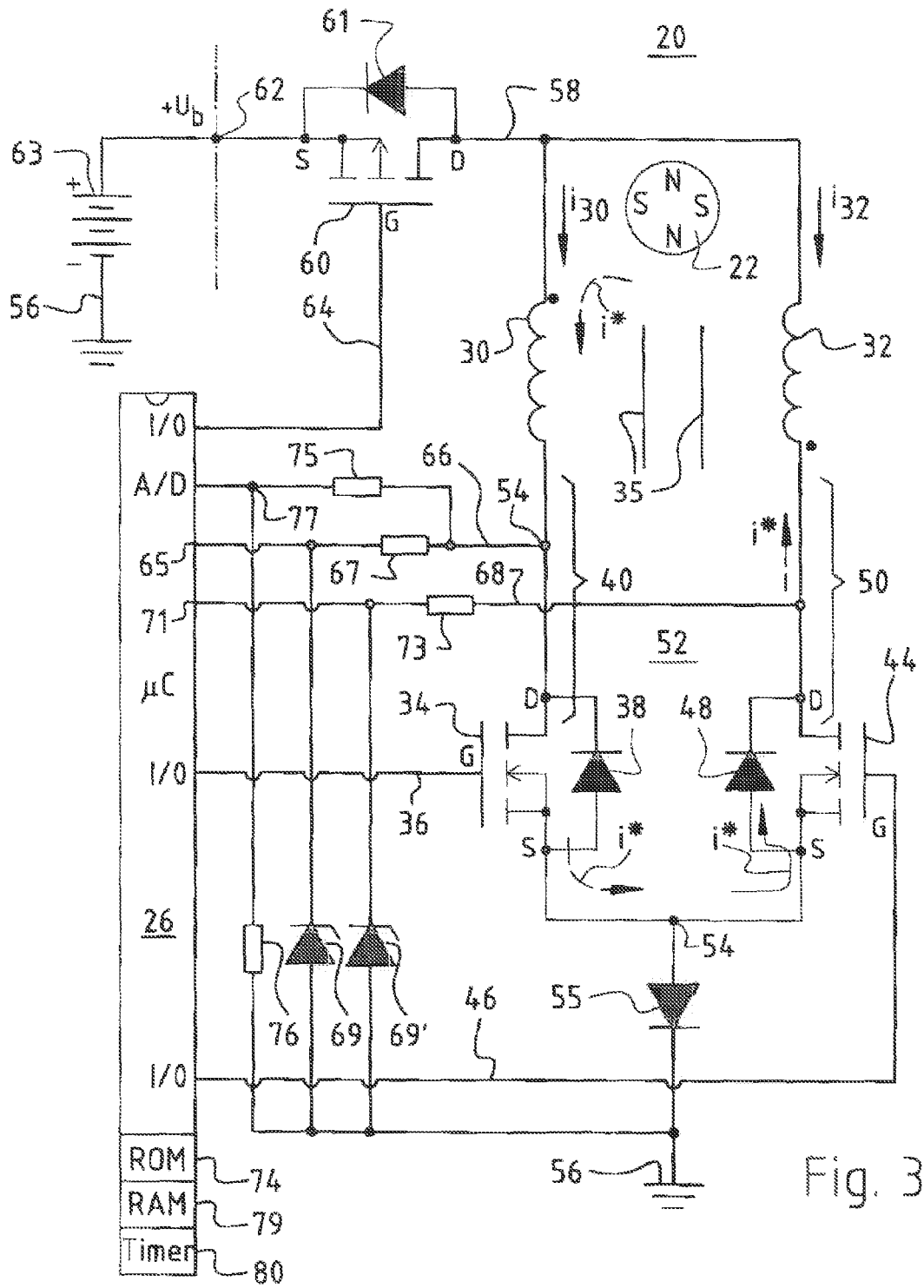
FIG. 3 is a circuit diagram of an embodiment of a one-phase motor that is equipped and configured to handle the situations shown in FIG. 1, the motor being illustrated as a two-strand motor.

FIG. 3. shows the circuitry of an ECM 20 that operates in a sensorless manner. Motor 20 has a permanent-magnet rotor 22 (indicated merely schematically) that is depicted with four poles but can also have two, six, eight, etc. poles. Rotor 22 can be an internal rotor, external rotor, the rotor of a motor having a flat or conical air gap, etc.

Motor 20 has a microcontroller μC 26, for example a PIC12F629 of MICROCHIP TECHNOLOGY INC. of Chandler, Ariz., USA. Relevant datasheets are, at the time of this writing, available from the website www.microchip.com/TechDoc.aspx?type=datasheet. The power supply system of μC 26 is, as usual, not depicted. Motor 20 has two stator winding strands 30, 32 that are usually magnetically coupled via the magnetic circuit of the motor, as indicated by symbol 35. Placed in series with first winding strand 30 is a first semiconductor switch, here e.g. an n-channel (Metal Oxide Semiconductor Field Effect Transistor (MOSFET) 34, which has a recovery diode 38 connected in antiparallel with it and which is controlled by μC 26 via a control line 36. Together with semiconductor switch 34 and diode 38, strand 30 forms a first series circuit 40 that can optionally contain further elements.

Located in series with second strand 32 is a second controllable semiconductor switch 44 that is controlled by μC 26 via a control line 46. This switch can likewise be an n-channel MOSFET that has a recovery diode 48 connected antiparallel to it. Together with second semiconductor switch 44, second strand 32 forms a second series circuit 50 that may contain further elements.

As FIG. 3 shows, the two series circuits 40, 50 are connected in parallel, to form a parallel circuit 52 whose bottom node 54 is connected to ground 56, optionally via a diode 55. The upper ends of strands 30, 32 are also connected to a DC link circuit 58. This means that, when semiconductor switch 34 is conductive, a current i30 flows from DC link circuit 58 through first strand 30 and, when semiconductor switch 44 is conductive, a current $i_{32}$ flows through strand 32. This statement must, however, be modified for the time intervals just before a commutation, as will be explained below.

Link circuit 58 is connected via a third semiconductor switch 60 (here a p-channel MOSFET) to a motor terminal 62, to which a positive operating voltage Ub, e.g. 12, 24, 48, 60 V, etc. is applied toward ground 56 during operation. A DC current source 63 of any suitable kind is depicted symbolically. A diode 61 is located antiparallel to third semiconductor switch 60. Third semiconductor switch 60 is controlled by μC 26, via a control line 64.

A potential from drain D of semiconductor switch 34 is delivered to a comparator input 65 of μC 26 through a sensor line 66 and a resistor 67. Input 65 is connected via a Zener diode 69 to ground 56, in order to protect said input 65 from overvoltage.

A potential from the drain of second semiconductor switch 44 is likewise delivered to a comparator input 71 of μC 26 through a sensor line 68 and a resistor 73. Input 71 is connected via a Zener diode 69' to ground 56, in order to protect input 71 from overvoltage.

In addition, a voltage divider made up of two resistors 75, 76, whose connecting node 77 is connected to input A/D of an analog-to-digital (A/D) converter in μC 26, is connected between drain D of first semiconductor switch 34 and ground 56.

Measuring Ub

This measurement is made via voltage divider 75, 76. The latter is dimensioned so that the internal reference voltage (in this case 5 V) of the A/D converter in μC 26 cannot be exceeded. This prevents measurement errors. Alternatively, this voltage divider can also be placed between source S of third semiconductor switch 60 and ground 56.

Voltage divider 75, 76 also has another function: depending on the amplitude of the voltages that are induced in strands 30, 32, said voltages are limited by protective diodes 69, 69'. It is important, for rotation direction detection, however, to sense the true shape of the induced voltages at inputs 65 and 71, respectively, which sensing would be impeded by voltage limiting. In this instance, the induced voltage is therefore sensed by way of voltage divider 75, 76 and input A/D of μC 26, with the result that the true shape of the induced voltage can also be detected.

The signals, at drains D of first semiconductor switch 34 and of second semiconductor switch 44, are sensed at comparators 65, 71 in μC 26.

Manner of Operation of FIG. 3

Figure 4:
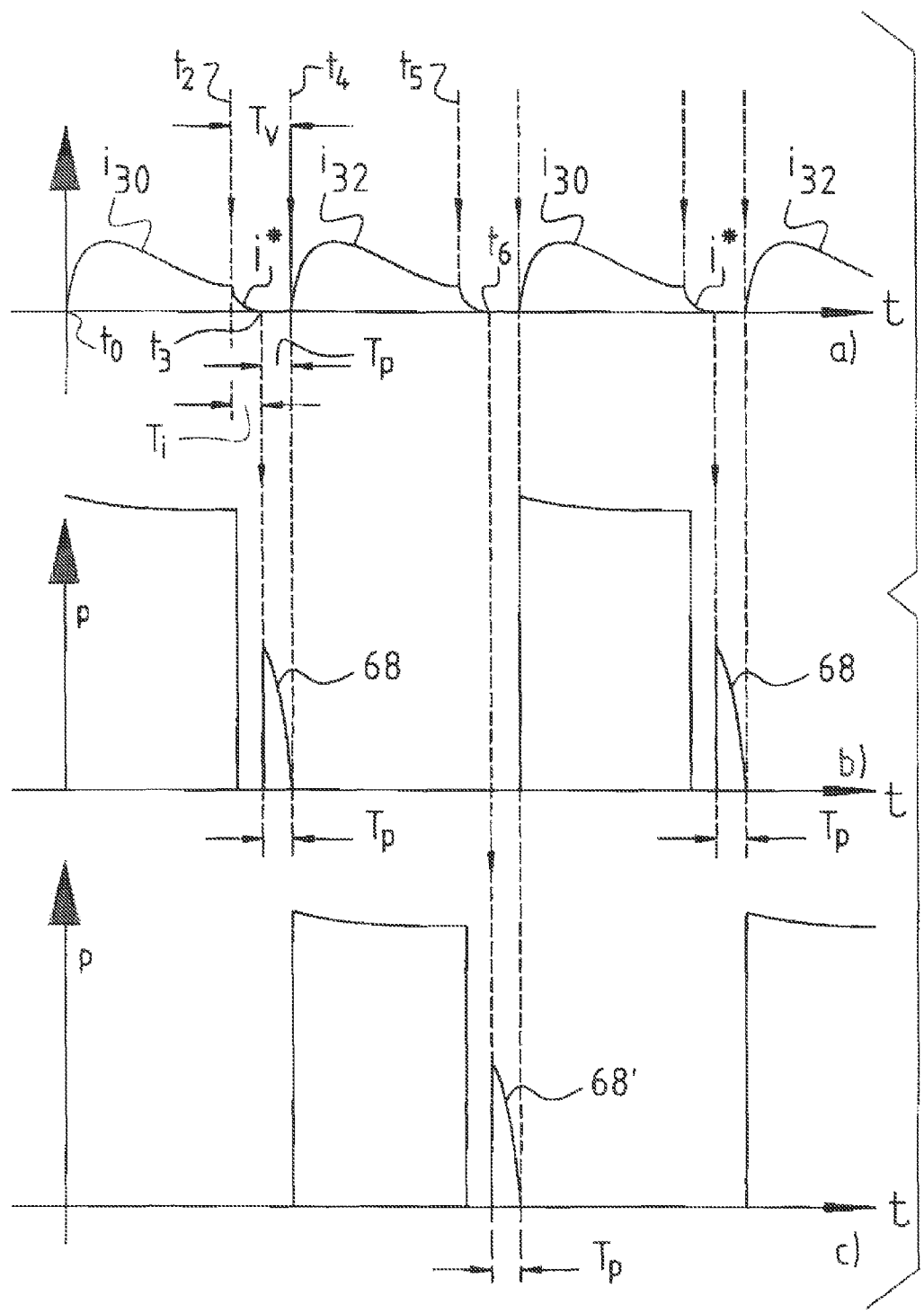
FIG. 4 is a depiction to explain FIG. 3.

Reference is made, for this purpose, to the graphs of FIG. 4.

Shortly before time t0 in FIG. 4, all three semiconductor switches (transistors) 34, 44, 60 in FIG. 3 are blocked, and motor 20 consequently receives no energy from terminal 62, i.e. energy delivery from DC source 63 is blocked or interrupted.

At time t0, transistors 34, 60 are switched on by μC 26, so that a current i30 flows from terminal 62 through transistor 60, link circuit 58, strand 30, transistor 34, and diode 55 (if present) to ground 56. Graph 4a) shows the shape of current i30, which of course depends on the value of the motor rotation speed and on other factors.

Commutation time t0 is followed by a commutation time t4 at which transistor 34 is switched off and transistor 44 is switched on, so that current i30 is shut off and current i32 (through strand 32) is switched on.

Located in a time interval Tv before t4 is a time t2 at which transistor 60 is blocked, so that energy delivery from terminal 62 is interrupted, i.e. no energy is delivered from DC source 63 to motor 20 during this time period Tv.

A specific current I flows in strand 30 shortly before time t2, so that a specific energy E is stored in strand 30 in accordance with the formula $$E = 0.5 * L * i^2 \quad (1)$$

where
e=energy stored in the magnetic field of the relevant strand
L=inductance of that strand
i=current at time t2.

This stored energy now causes a loop current i* to flow through strand 30 because transistor 34 is once again conductive. This loop current i* flows from the lower terminal 54 of strand 30 through transistor 34, node 54, recovery diode 48, and the two strands 32 and 30, so that as before, it generates a driving torque on rotor 22, with the result that loop current i* rapidly drops and, at time t3 of FIG. 4a), reaches a value of zero. Transistor 34 can therefore be blocked in wattless manner as of time t3, since loop current i* has become zero.

FIG. 4 shows the sequence over time.

Transistor 60 is blocked at time t2, so that from that time onward a loop current i* flows. This current becomes zero at time t3, so that transistor 44 can be blocked without switching losses.

While loop current i* is flowing, drains D of transistors 34 and 44 are substantially grounded. After loop current i* ends, a signal 68 that corresponds to the induced voltage in the currentless strand 32 is produced at drain D of the nonconductive transistor 44. At time t4 this signal 68 causes commutation, i.e. causes the (hitherto blocked) transistors 44 and 60 to switch on, and causes transistor 34 to be blocked, so that a current i32 now flows through strand 32.

The above-described processes then iterate or repeat continuously, as is evident in view of the symmetry of the circuit, i.e. transistors 34 and 44 become alternatingly conductive or blocked, and corresponding loop currents flow. When transistor 34 is conductive, loop current i* flows counter-clockwise; and when transistor 44 is conductive, loop current −i* (not depicted) flows clockwise.

Sensing the Rotation Direction

To sense the rotation direction of motor 20, motor current $i_{mot}$, is briefly switched off in order to make motor 20 currentless, for example, during one electrical rotation, i.e. during approx. 360° el. The rotating rotor magnet 22 then induces a voltage in both strands 30 and 32.

Figure 5:
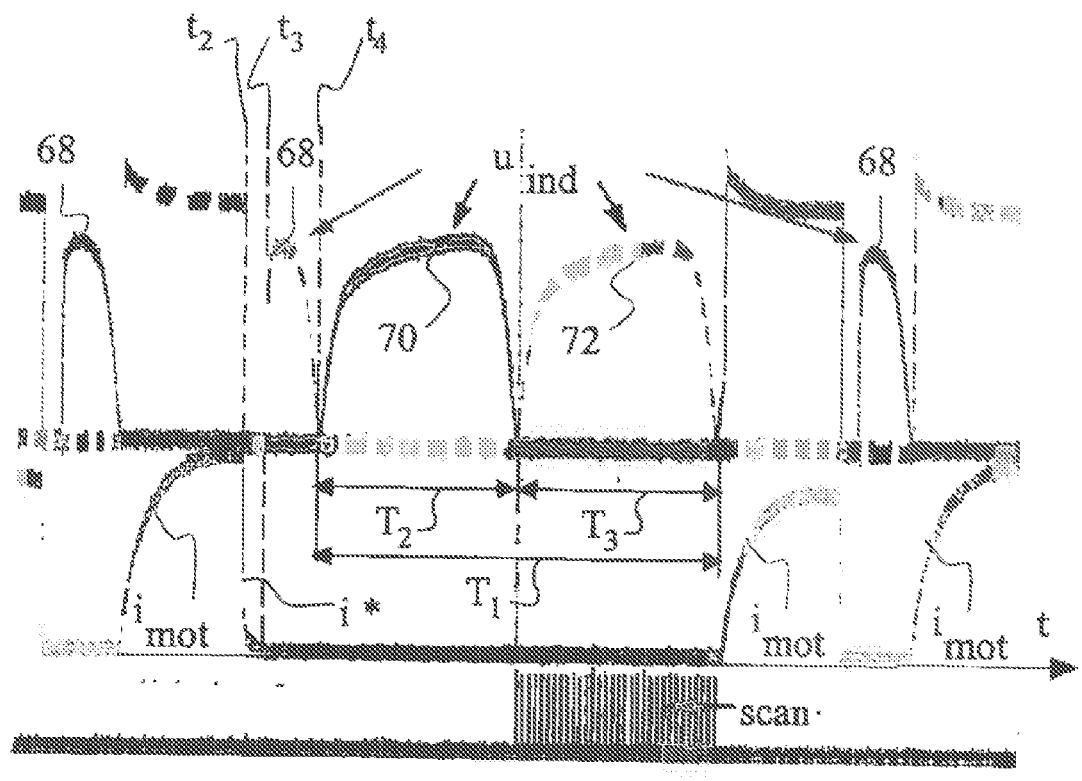
FIG. 5 is a depiction to explain FIGS. 6 and 7.

This results in the situation illustrated in FIG. 5.

At time t2, transistor 60 becomes blocked, so that motor current $i_{mot}$ converted into a loop current i* that becomes zero at time t3, so that as of t3 the induced voltage $u_{ind}$, which causes transistor 34 to be blocked at time t4, can be measured at drain D of transistor 44.

Beginning at t4 two half-waves 70, 72 of the induced voltage are obtained, and are delivered to μC 26. At the end of second half-wave 72, current $i_{mot}$ is switched back on.

A timer 80 in μC 26 is switched on at time t4 in order to measure the combined duration T1 of the two half-waves 70, 72. This timer 80 also measures duration T2 of first half-wave 70, so that duration T3 of second half-wave 72 can be calculated as $$T3 = T1 - T2 \quad (2).$$

When rotor 22 is rotating continuously and uniformly, T2 and T3 are of approximately equal magnitude. If this is not the case, the rotation of rotor 22 has been disturbed, for example by a wind gust; the measurement therefore cannot be used and must be repeated.

Figure 6:
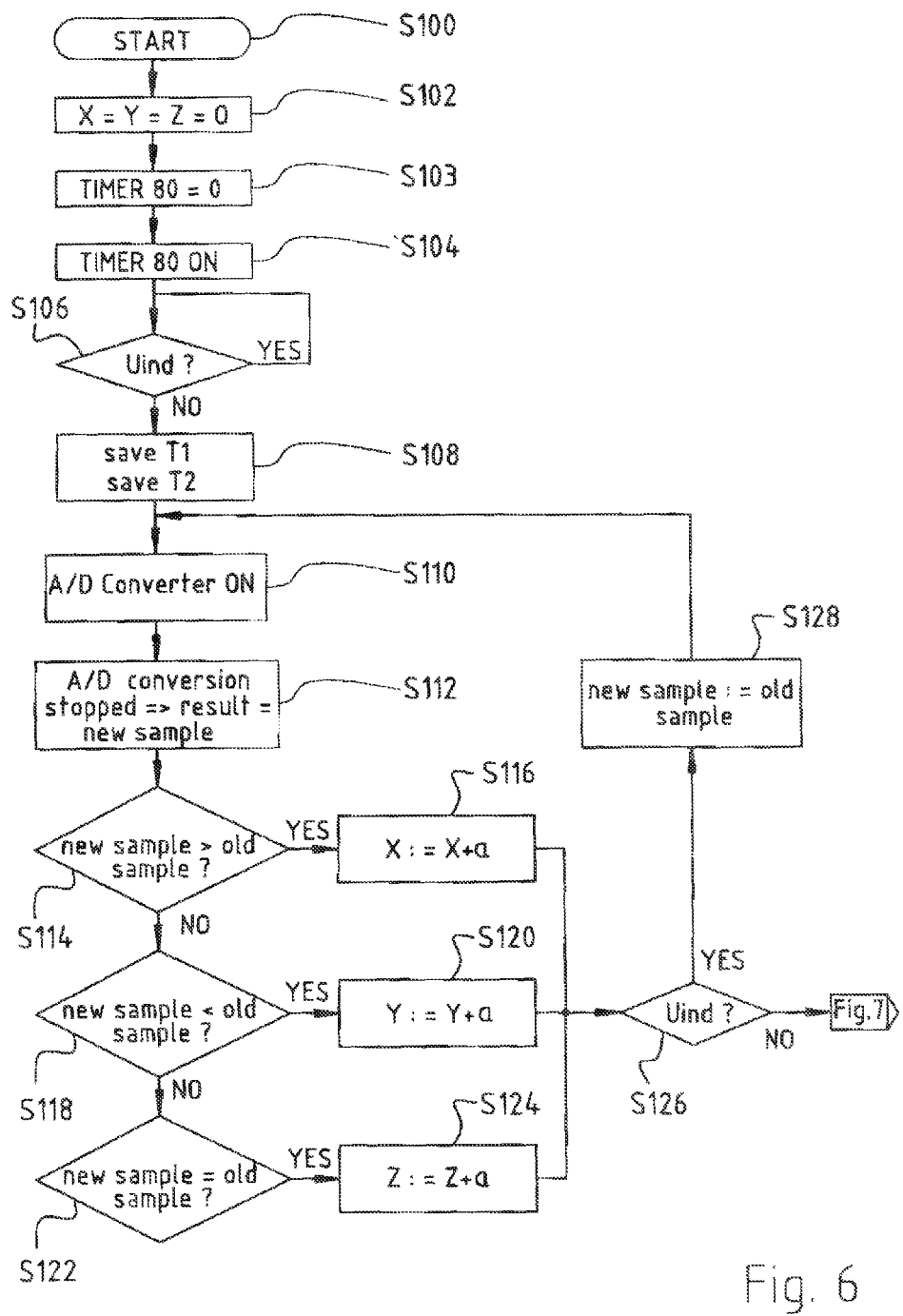
FIG. 6 is the flowchart of a first part of a program sequence to ascertain the rotation direction.
Figure 7:
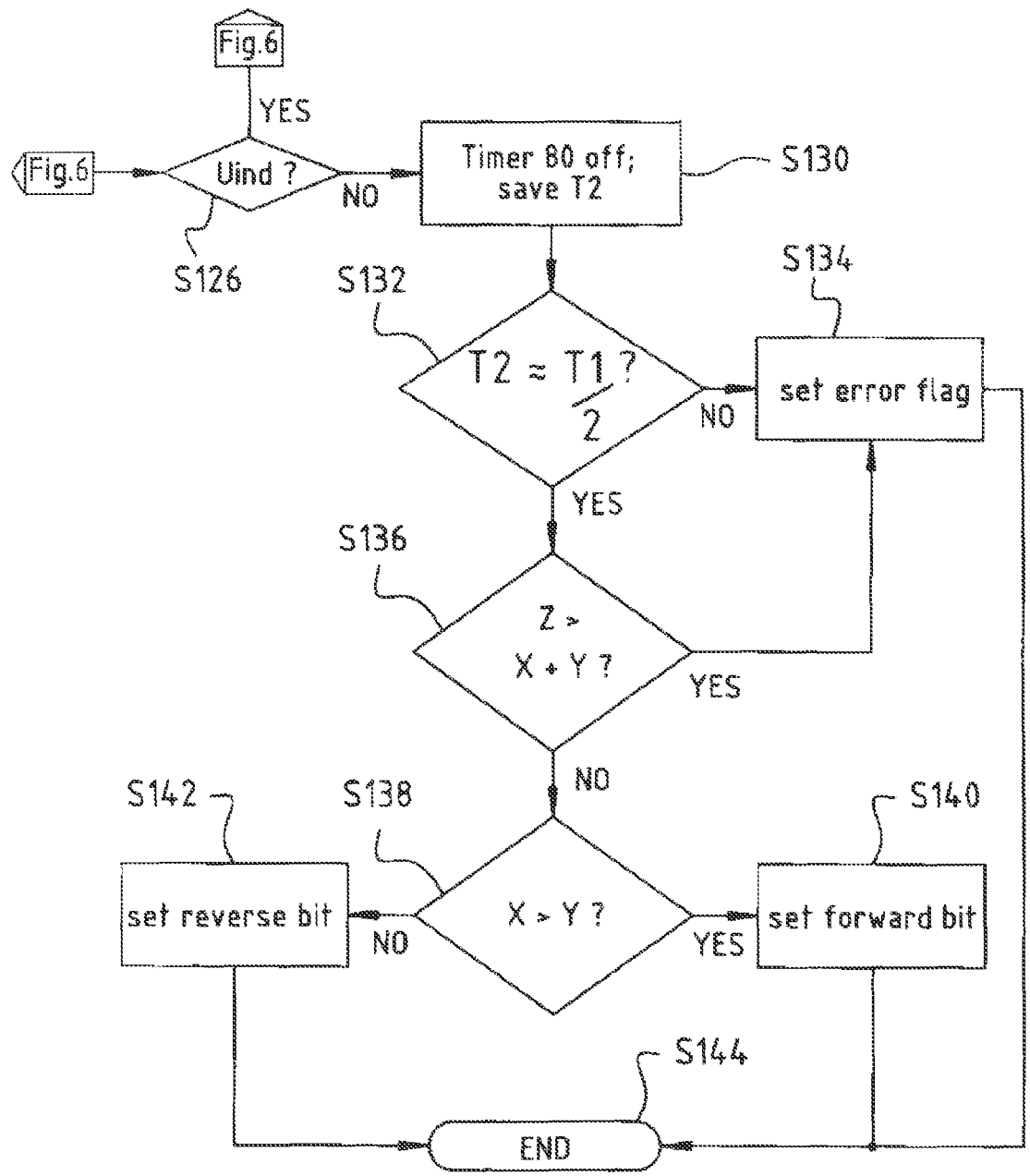
FIG. 7 is the flowchart of the second part of the program sequence of FIG. 6.

FIG. 6 and FIG. 7 show how the rotation direction is identified. The program can be stored in a ROM 74 or RAM 79, for example in μC 26.

After startup at S100, in a step S102 three memories X, Y, and Z are set to zero, likewise timer 80 at S103.

Timer 80 is then switched on in S104 at time t4.

S106 checks whether induced voltage $U_{ind}$, has a value differing from zero. If NO, a measurement of time spans T1 and T2 is initiated at S108 by timer 80.

At S110, the A/D converter in μC 26 is then switched on, in order to digitize a measured value.

At S112, A/D conversion is ended, and a new digital value is obtained that is usually different from the old, i.e. previous, value.

In S114, the new value is compared with the previous "old" value. If the new value is greater than the old value, at S116 a constant a is added to memory X. If, at S118, the new value is less than the old value, constant a is then added to memory Y in S120.

If the values are equal in S122, then in S124 the value a is added to memory Z.

The program then goes to step S126, which checks whether induced voltage $u_{ind}$ is different from zero. If YES, the program goes to step S128, where the previous value is replaced by the new value from S112, and then a new analog value of the induced voltage is digitized in S110.

FIG. 7 shows further processing of the results from FIG. 6.

If it is found, in S126, that induced voltage $u_{ind}$ has dropped to zero, timer 80 is switched off in S130, and S132 checks whether the value of duration T2 corresponds approximately to one-half of T1. This situation exists when rotor 22 is rotating. at approximately constant speed. If that is not the case, an "error flag" or error signal is set in S134.

If the response at S132 is YES; S136 then first checks whether the value in memory Z is greater than the sum of the values in memories X and Y. This means that in most of the instances tested, induced voltage $u_{ind}$ has not changed. This indicates an error, and in this case the program therefore goes to S134, where the error signal is set.

If the response at S136 is NO, the program goes to S138 to see whether the values in memory X exceed the values in memory Y. If the response there is YES, rotor 22 is therefore running forward, i.e. in preferred direction PRDIR, and in S140 the forward bit is set.

If the response in S138 is NO, then in S142 the reversing bit is set; this means that motor 20 must be reversed. The program then goes to step S144, i.e. the routine is complete.

It is possible in this manner, for example, to identify the rotation direction during a single revolution of rotor 22, motor 20 being briefly currentless during this process.

Figure 8:
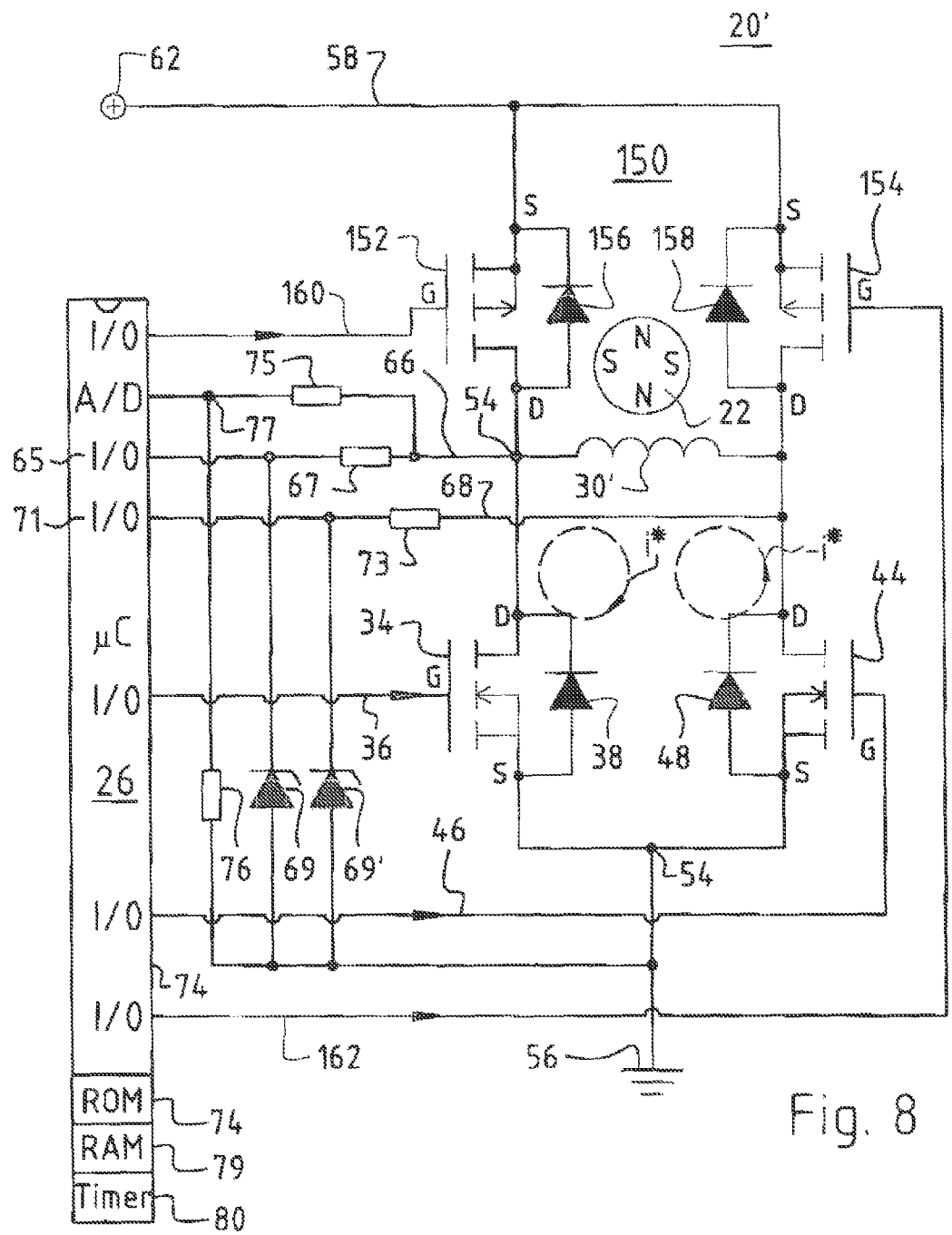
FIG. 8 is a circuit diagram, analogous to FIG. 3, of a one-phase ECM that in this case is implemented in a single-strand manner, i.e. has only a single strand that is controlled via an H-bridge.

FIG. 8 shows the implementation for an ECM that is implemented as a single-strand, two-pulse ECM 20'.

The only winding strand 30' is arranged between drains D of the two lower n-channel MOSFETs 34, 44 of an H-bridge 150 whose upper bridge transistors 152, 154 are implemented as p-channel MOSFETs that each have a respective recovery diode 156, 158 connected in antiparallel with them. Drain D of transistor 152 is connected to drain D of transistor 34, and drain D of transistor 154 is connected to drain D of transistor 44. Transistor 152 is controlled by μC 26 via a control line 160. Transistor 154 is likewise controlled by μC 26 via a control line 162. (Control is usually applied to upper transistors 152, 154 via interposed amplifiers, which are not shown in this schematic diagram.)

During operation, a current flows from terminal 62 through transistor 152, winding strand 30', and transistor 44 to ground 56; and after a rotation of rotor 22 through less than 180° el., commutation occurs to a current from terminal 62 through transistor 154, winding strand 30', transistor 34, and to ground 56.

In order to measure the induced voltage for an identification of the rotation direction, both upper transistors 152, 154 are blocked, so that then, initially, a loop current i* flows through winding strand 30' and the two lower transistors 34, 44 and recovery diodes 38, 48.

Once loop current i* has reached a value of zero, the induced voltage and its profile are measured in the same manner as described in detail with reference to FIGS. 3, 6, and 7, thereby yielding the rotation direction.

Figure 9:
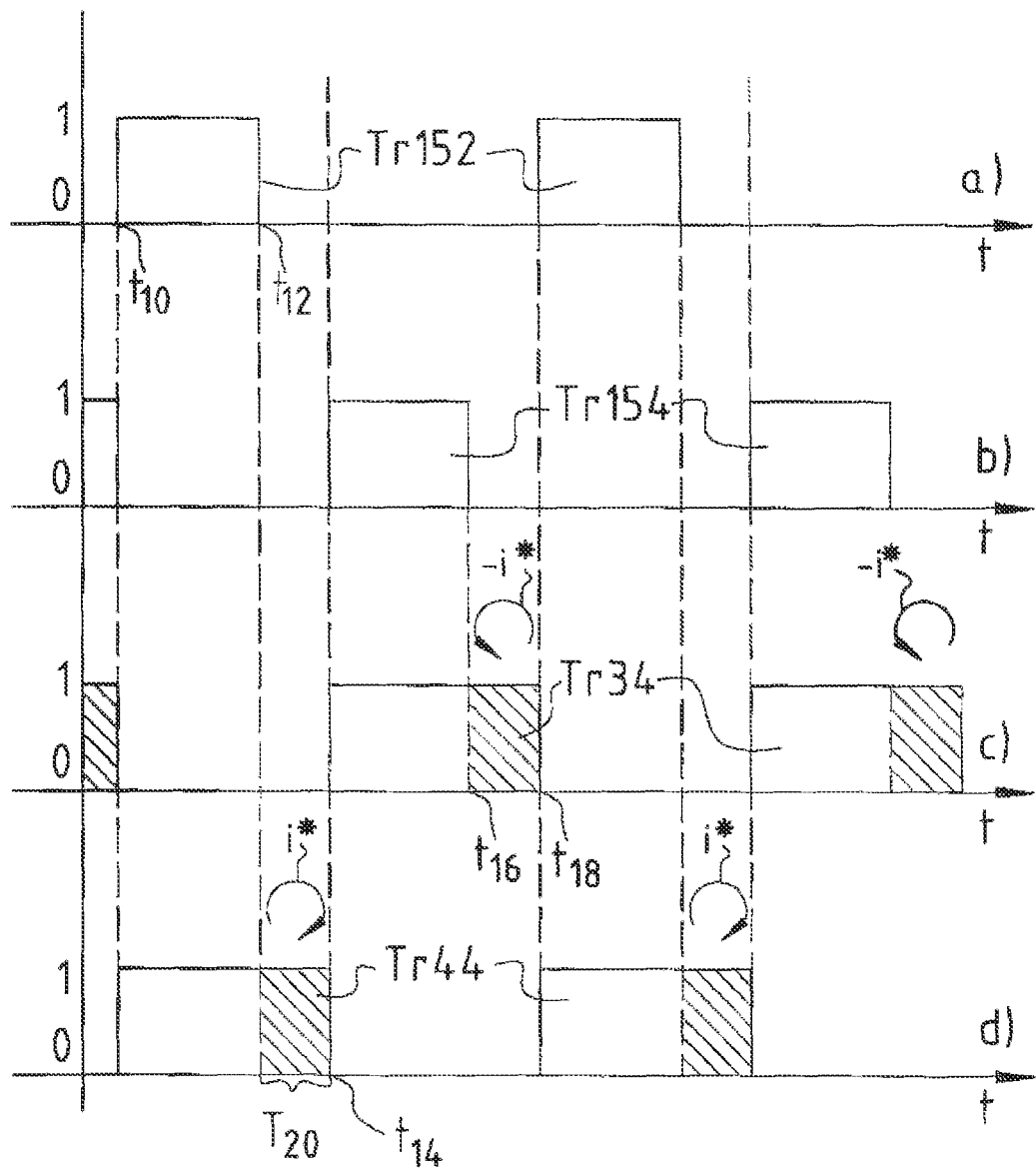
FIG. 9 is a set of current graphs to explain FIG. 8.

Reference is made to FIG. 9 regarding the manner of operation of FIG. 8.

At time t10, both transistors 152 and 44 are switched on, so that a current flows from terminal 62 through transistor 152, strand 30' (from left to right), and transistor 44 to ground.

At time t12 transistor 152 is blocked, so that energy delivery from outside is interrupted. Transistor 44 remains conductive.

Since current can no longer flow from terminal 62 to the motor, the current in strand 30' is maintained by the energy stored in that strand, and a loop current i* now flows (clockwise), during time period T20 of FIG. 9, through strand 30', through (still conductive) transistor 44, and back through recovery diode 38 to strand 30'.

This loop current i* continues to drive rotor 22 and drops quickly (within time period T20) to zero.

When loop current i* has dropped to zero, the voltage $u_{ind}$ (analogous to signal 68 of FIG. 4b) that is induced by rotor 22 in strand 30' can be measured at drain D of transistor 44; this voltage indicates that commutation can now occur. The curve is in this regard identical to FIG. 4 between times t2 and t3.

In the course of commutation, transistor 44 becomes blocked at time t14 and, after a brief pause of, for example, 30 μs, the two transistors 154 and 34 are switched on, so that a current flows from terminal 62 through transistor 154, strand 30' (from right to left), and transistor 34 to ground 56.

At time t16 transistor 154 is blocked, and a loop current –i* then flows (counter-clockwise) through (still conductive) transistor 34, recovery diode 48, and strand 30'. This current –i* quickly drops to zero, after which it is possible to measure at drain D of transistor 34 (analogously to signal 68 of FIG. 4) the induced voltage that is induced by rotor 22 in strand 30' and that brings about a new commutation at time t18, as depicted in FIG. 9.

Sensorless commutation in the desired rotation direction, which ensures that motor 20 rotates in the required rotation direction even under difficult conditions, is thereby achieved.

Many variations and modifications are of course possible, within the scope of the present invention.

What is claimed is:

1. An electronically commutated one-phase motor (20) having a stator having at least one winding strand (30, 32; 30') and a permanent-magnet rotor (22), which latter induces, as it rotates, a voltage ($u_{ind}$) in said at least one winding strand (30, 32), and
   an electronic calculation device (26) which is implemented to repetitively execute, during motor operation, the steps of:
   a) sampling the induced voltage ($u_{ind}$) in a currentless winding strand (30, 32) during a predetermined portion (72) of the induced voltage, in order to obtain a plurality of analog voltage values;
   b) digitizing the analog voltage values, in order to obtain a plurality of digitized voltage values;
   c) ascertaining any difference between a present digitized voltage value (new sample) and a digitized voltage value previous to said present value (old sample);
   d) ascertaining the sign of the difference;
   e) ascertaining the number (X) of voltage values having a positive difference;
   f) ascertaining the number (Y) of voltage values having a negative difference;
   g) as a function of a ratio between said two numbers (X;Y), ascertaining the rotation direction (DIR) of the rotor (22).

2. The motor according to claim 1, in which
identifying a number (Z) of comparisons in which identity is ascertained between the present digitized value (new sample) and the previous digitized value (old sample) employed for comparison, and
correlating said number (z) with the sum (X+Y) of the comparisons in which a difference is ascertained between the present digitized value (new sample) and the previous digitized value (old sample).

3. The motor according to claim 1, further comprising
measuring time durations (T1, T3) for two successive halfwaves (70, 72) of the voltage ($u_{ind}$) induced in the currentless winding strand
and
comparing said time durations with one another, in order to generate a corresponding signal, in the event of a deviation, between said durations, that exceeds a predetermined limit value.

4. The motor according to claim 2, further comprising
measuring time durations (T1, T3) for two successive halfwaves (70, 72) of the voltage ($u_{ind}$) induced in the currentless winding strand
and
comparing said time durations with one another, in order to generate a corresponding signal, in the event of a deviation, between said durations, that exceeds a predetermined limit value.

* * * * *